June 8, 1965

C. A. FENWICK 3,187,713

LINEAR DIAL FOR RADIO TRANSMITTER OR RECEIVER
WITH MOVING POINTER AND SCALE
Filed Feb. 6, 1964

INVENTOR.
CHARLES A. FENWICK

BY

ATTORNEY

United States Patent Office 3,187,713
Patented June 8, 1965

3,187,713
LINEAR DIAL FOR RADIO TRANSMITTER OR RECEIVER WITH MOVING POINTER AND SCALE
Charles A. Fenwick, Cedar Rapids, Iowa, assignor to Collins Radio Company, Cedar Rapids, Iowa, a corporation of Iowa
Filed Feb. 6, 1964, Ser. No. 343,007
8 Claims. (Cl. 116—124.3)

This invention relates in general to an indicator type dial and in particular to a vernier dial which might be used in radio equipment.

As shown in Patent 2,766,375 it is oftentimes desirable to indicate the frequency of a radio receiver, for example. However, it has previously been necessary to use two dials to show the coarse and fine tuning.

The present invention discloses a linear dial for radio receiver which has an indicia which is read against a first scale to indicate the coarse tuning range and against a second movable scale to indicate the fine tuning range.

It is an object of the present invention to provide an improved dial system for a radio transmitter or receiver. Another object is to provide an indicator system capable of being read to a number of significant figures.

A feature of this invention is found in a provision for a tuning indicator comprising a drum, a moving belt and indicator that together indicate the tuning of a device.

Further features, objects and advantages of the invention will become apparent from the following description and claims, when read in view of the drawings in which:

Figure 1:
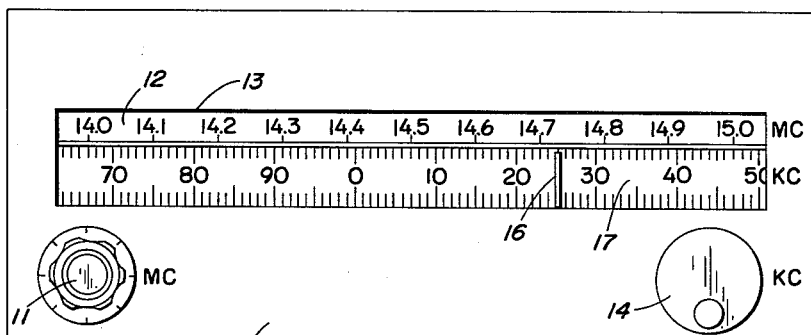
FIGURE 1 is a front view of an indicator dial according to this invention.

FIGURE 1 illustrates a radio device which might be a receiver or transmitter mounted in a case 10. A coarse tuning dial 11 is coupled to move a first indicia 12 within a window 13 and a fine tuning knob 14 is coupled to move a pointer 16 and vernier tape 17. The frequency of the set can be read by noting the position of pointer 16 relative to indicia 12 and tape 17.

Figure 2:
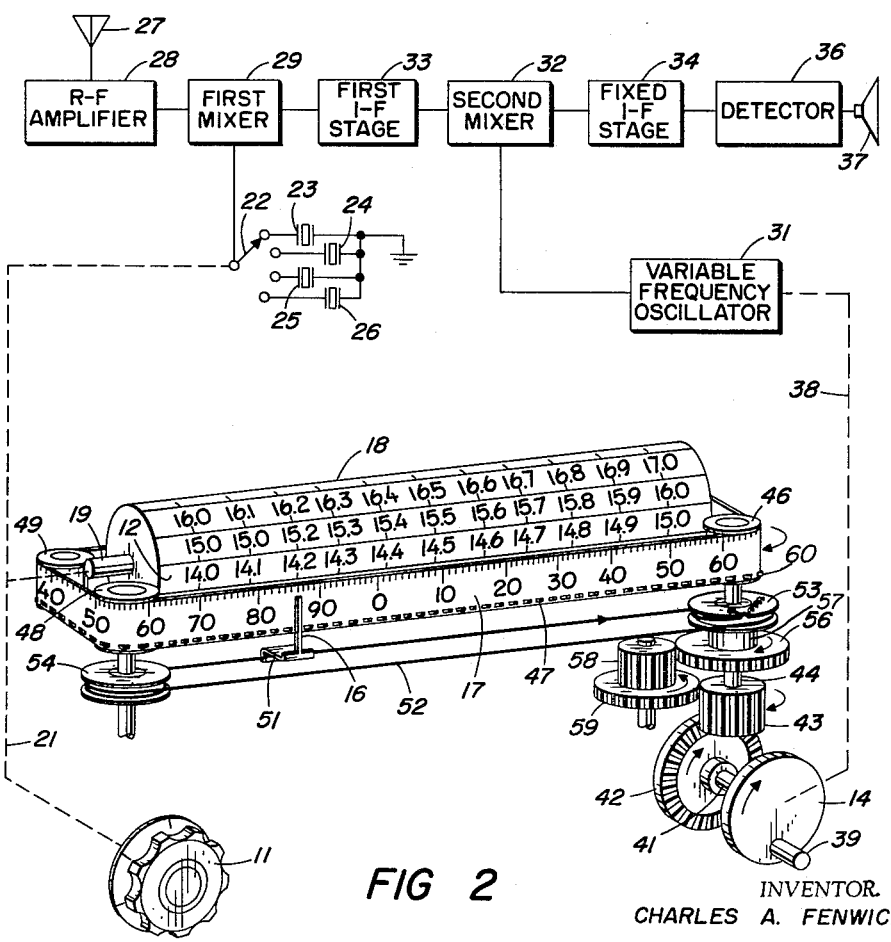
FIGURE 2 is a schematic illustration of the indicator drum, tape, pointer and drive mechanisms in their inventive relationship.

As best shown in FIGURE 2, the indicia 12 is mounted on a megacycle drum 18 which is supported by a shaft 19 that is coupled to knob 11 by shaft 21. The drum and shaft 19 are suitably detented so that one of a number of indicia 12 will appear in the window 13.

The shaft 21, for example, might also be connected to a switch 22 which selects a crystal 23 from a bank of crystals 23, 24, 25 and 26. Switch 22 is connected to a first mixer 29 which also receives an input from an R-F amplifier 28 which is connected to a suitable antenna 27. Thus, by selecting one of the crystals 23 through 26 a particular coarse tuning range may be selected. For example, crystal 23 in the particular example produces an output of the receiver between 14 and 15 megacycles and the knob 11 is chosen to change a one megacycle range at a time.

For fine tuning with a megacycle range a variable frequency oscillator 31 applies an input to a second mixer 32 which receives an input from the first I-F stage 33 which is in turn connected to the first mixer 29. A fixed I-F stage 34 is connected to the second mixer and a detector 36 receives the output of the fixed I-F stage 34. A speaker 37 is connected to the output of detector 36.

A shaft 38 is connected to the variable frequency oscillator 31 and is driven by knob 14. Knob 14 has a pin 39 to allow rapid slewing. Knob 14 is also connected to a shaft 41 which carries a face gear 42 which is in mesh with a gear 43. Gear 43 is connected to a shaft 44 which carries sprocket pulley 46. The flexible indicator tape 17 passes over the sprocket pulley 46 and is formed with sprocket engaging openings 47 into which the sprocket teeth 60 of the sprocket pulley are reecived. Three more sprocket pulleys are mounted about the cylinder 18 and two of these, 48 and 49, are illustrated in FIGURE 2. Thus, rotation of the shaft 44 drives the tape 17 through the sprocket arrangement.

The indicator pointer 16 is connected by bracket 51 to a driving belt 52 which passes over pulleys 53 and 54 at either end of the cylinder 18. The belt is attached to one of the pulleys in a conventional manner to prevent slipping. Pulley 53 is driven by a gear 56 through hub 57. Gear 56 is in mesh with a gear 58 which is attached to gear 59. Gear 59 is in mesh with gear 43. It is to be noted that pulley 53, hub 57 and gear 56 are freely rotatably supported on shaft 44. This allows the pulley 53 to turn in the opposite direction to sprocket pulley 46 which is necessary to get different speeds for pulleys 46 and 53. The gear ratios are such that pulley 46 moves the tape 17 from 0 to 100 underneath the pointer 16 as the pointer moves from 14.1 to 14.2 in the example of FIGURE 2. By mounting the pointer on the rearward portion of belt 52 as shown in FIGURE 2, the pointer 16 and tape 17 move in opposite directions.

The tape 17 is continuous and may have the numerals 0-100 repeated three times on its surface. Of course, the tape could be non-continuous if desired.

Thus, there is provided a single pointer 16 which can be read against indicia 12 to give the coarse position and against the tape 17 to give the fine position. The indicator 16 in FIGURE 1 reads 14.725 megacycles, for example. In FIGURE 2 the pointer reads 14.186 megacycles.

Prior to this invention it has not been possible to read frequency so accurately with a single dial and single indicator.

Although this apparatus has been described with respect to a preferred embodiment it is not to be so limited as changes and modifications are within the full intended scope as defined by the appended claims.

I claim:

1. An indicator comprising a container, a window formed in the container, a drum rotatably supported and with a plurality of scales printed thereon such that a particular scale is visible through the window, a movable tape having fine indicia visible through the window adjacent said drum, a movable pointer mounted within the container and visible in the window adjacent one scale of said drum and said fine indicia, said pointer supported to move in a direction opposite to said tape and the pointer and the fine indicia calibrated such that the pointer moves between adjacent segments of the scale on the drum, as the fine indicia of said tape passes from a minimum to a maximum reading relative to the pointer.

2. In apparatus according to claim 1 wherein the pointer and fine indicia move in opposite directions.

3. An indicator mechanism comprising a container, a window formed in the container, a drum having a coarse scale printed on its surface with said scale visible through the window, a tape having a plurality of fine scales movably mounted within said container and adjacent said drum, one side of said tape being visible through the window, a pointer mounted to point to said coarse scale and to one of said fine scales, said pointer being mounted on a belt which is rotatably supported within the container, said pointer movable in a direction opposite to the movement of the tape, gearing connected to drive said tape and said pointer in opposite directions, and means for driving said gearing so that said pointer points to a coarse reading and a fine reading which can be combined to give an accurate reading containing all the digits from both readings.

4. In apparatus according to claim 3 wherein the tape moves from a minimum to a maximum reading relative to the indicator as the indicator moves between adjacent segments on the scale of the drum.

5. The mechanism of claim 3 wherein said drum is rotatably supported within said container and has a plurality of coarse scales.

6. The indicator of claim 3 wherein said scale readings represent the coarse tuning frequency of a radio receiver and said indicia represent the fine tuning frequency of a radio receiver.

7. An indicator mechanism comprising a container, a window formed in said container, said window having a first axis and second axis perpendicular thereto, a drum rotatably mounted in said container for rotation in a direction parallel to said first axis, a plurality of scales printed on said drum, said scales being successively visible through said window as said drum is rotated, a tape rotatably mounted in said container for rotation in a direction parallel to said second axis, a plurality of indicia printed on said tape, said indicia being visible in said window, a pointer movably mounted in said container, said pointer moving in a direction opposite to that of said tape, said pointer simultaneously pointing to said scale and said indicia to give a reading containing the characters of both said scale and said indicia.

8. The indicator of claim 7 wherein said scale has characters representing ten-thousands, thousands, and hundreds, aid said indicia are characters representing tens and units, so that a reading having five significant figures can be obtained from each pointer position.

References Cited by the Examiner
UNITED STATES PATENTS

| | | | |
|---|---|---|---|
| 2,078,270 | 4/37 | Newman | 116—124.1 |
| 2,120,136 | 6/38 | Lyman | 116—124.1 |
| 2,132,094 | 10/38 | Brodton | 116—124.1 |
| 2,164,889 | 7/39 | Sorenson | 116—124.1 |
| 2,186,099 | 1/40 | Cutting et al. | 116—124.1 |
| 2,373,168 | 4/45 | Cockwell | 116—124.1 |
| 2,437,306 | 3/48 | Ramsay | 116—124.1 |
| 2,539,458 | 1/51 | Myers | 116—124.1 |
| 2,556,875 | 6/51 | Hallstrand et al. | 116—124.1 |
| 2,570,602 | 10/51 | Shawver | 116—124.1 |
| 2,585,565 | 2/52 | Luck | 116—135 |
| 2,606,239 | 8/52 | Beste | 74—10.7 |

LOUIS J. CAPOZI, *Primary Examiner.*

LEO SMILOW, *Examiner.*